(12) United States Patent
Ryan

(10) Patent No.: US 7,100,521 B2
(45) Date of Patent: Sep. 5, 2006

(54) BAFFLE FOR INCREASED CAPTURE OF POPCORN ASH IN ECONOMIZER HOPPERS

(75) Inventor: Anthony Michael Ryan, Oak Park, IL (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 11/033,085

(22) Filed: Jan. 10, 2005

(65) Prior Publication Data
US 2005/0150439 A1    Jul. 14, 2005

Related U.S. Application Data

(60) Provisional application No. 60/535,468, filed on Jan. 8, 2004.

(51) Int. Cl.
F23J 3/00 (2006.01)
(52) U.S. Cl. ........................... 110/216; 110/342
(58) Field of Classification Search ............ 110/165 A, 110/165 R, 342, 345, 216, 217; 122/4 D
See application file for complete search history.

(56) References Cited

U.S. PATENT DOCUMENTS 4,213,403 A * 7/1980 Gomori ...................... 110/216
4,286,548 A * 9/1981 Brash ........................... 122/1 R
5,738,711 A * 4/1998 Finnemore ................... 95/268
6,510,820 B1 * 1/2003 McDonald ................ 122/155.1

* cited by examiner

Primary Examiner—Kenneth Rinehart
(74) Attorney, Agent, or Firm—Eric Marich

(57) ABSTRACT

A baffle employs a particular arrangement of baffle plates in a three dimensional configuration to aerodynamically separate popcorn ash particles from a flue gas flow. The baffle is attached to the rear wall of an economizer outlet flue back pass and is placed just below the economizer gas outlet. The baffle is designed to be uniquely shaped in three dimensions to redirect the large popcorn ash particles towards the deepest parts of the hoppers, which increases the fraction of the ash particles that are captured in the hoppers and decreases the potential for plugging in downstream equipment. The baffle is comprised of several triangular plates, usually three plates for every hopper. Each group of three plates is placed such that they appear to be three sides of an inverted pyramid. The open, fourth side of each of these pyramid shapes is on the side of the baffle closest to the front wall. The sizes and angles of the triangular plates are optimized for a maximum capture rate of popcorn ash particles by taking into account the particles' size, aerodynamic properties, and coefficient of restitution as well as the size, slopes, and position of the hoppers. The flue gas flow rate, pressure drop, and the possibility of ash accumulation on the top of the baffle are also taken into consideration.

1 Claim, 5 Drawing Sheets

BAFFLE FOR INCREASED CAPTURE OF POPCORN ASH IN ECONOMIZER HOPPERS

This application claims the benefit of Provisional Application No. 60/535,468, filed Jan. 8, 2004.

FIELD AND BACKGROUND OF THE INVENTION

The present invention relates, in general, to the field of fossil-fueled (particularly coal fired) steam generators used in the production of steam for industrial processes or electric utility power generation. In particular, the present invention is drawn to a baffle for increasing the capture of ash in hoppers so that downstream equipment, such as selective catalytic reduction (SCR) devices, are not subjected to excessive amounts of ash which might otherwise plug the catalyst used in such SCR devices and render them ineffective.

Persons skilled in the art of industrial and utility boiler design used in the production of steam for industrial processes or electric utility power generation are quite familiar with such devices and thus the particular details regarding same have been omitted herein for the sake of conciseness and readability. For further details of such industrial and utility boiler installations, as well as a description of various types of environmental clean-up equipment such as SCR's used in combination with such steam generator equipment, the reader is referred to *STEAM/its generation and use*, 40$^{th}$ Edition, Stultz and Kitto, Jr., Eds., Copyright© 1992 The Babcock & Wilcox Company, the text of which is hereby incorporated by reference as though fully set forth herein.

A set of hoppers can normally be found below the economizer gas outlet of such steam generators. The flue gas and entrained ash particles produced as a byproduct of the combustion of a fossil fuel such as coal is conveyed through the steam generator in order to transfer heat to water and steam used in the industrial process or sent to a steam turbine in order to produce electricity, in a manner well known to those skilled in the art. As the entrained fly ash settles out of the flue gas flow, it falls into these hoppers and then is removed either pneumatically or mechanically.

There have been a number of recent events in the industry in which the top catalyst layers of an SCR system provided to reduce NOx emissions from such steam generators have become plugged with popcorn ash. This blockage can cause increased pressure drop, decreased catalyst performance, and under the worst circumstances can force an SCR system to be taken off line. Popcorn ash is a type of large particle ash which is light, porous, irregularly shaped, and often forms in the upper furnace or on the convective section heat exchanger surfaces of such steam generators. Popcorn ash particles can easily reach a size of up to ten millimeters or more. With standard flue gas outlet and hopper designs a portion of these large particles usually does not get captured. Particles greater than four or five millimeters in size have been known to cause SCR catalyst plugging.

Some past solutions to this problem have involved placing flat baffles between the economizer and the hoppers and/or by placing wire mesh screens across the outlet flue. The flat baffles create a tortuous path for the flue gas flow which the large particles cannot follow. The wire mesh screen physically blocks the large particles while allowing the flue gas to flow through.

SUMMARY OF THE INVENTION

Accordingly, and as illustrated in FIG. 7, one aspect of the present invention is drawn to an improved baffle (I) that is attached to the rear wall of an economizer outlet flue back pass and is placed just below the economizer gas outlet (II). The design of the baffle is uniquely shaped in three dimensions to redirect the large popcorn ash particles towards the deepest parts of the hoppers (III). This increases the fraction of the ash particles that are captured in the hoppers and decreases the potential for plugging in SCR catalyst blocks located downstream of the economizer.

The baffle consists of several triangular plates, usually three plates for every hopper. Each group of three plates is placed such that they appear to be three sides of an inverted pyramid. The open, fourth side of each of these pyramid shapes is on the side of the baffle closest to the front wall. The sizes and angles of the triangular plates are optimized for a maximum capture rate of popcorn ash particles by taking into account the particles' size, aerodynamic properties, and coefficient of restitution as well as the size, slopes, and position of the hoppers. The flue gas flow rate, pressure drop, and the possibility of ash accumulation on the top of the baffle are also be taken into consideration.

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which a preferred embodiment of the invention is illustrated.

DESCRIPTION OF THE PREFERRED EMBODIMENTS

Figure 1:
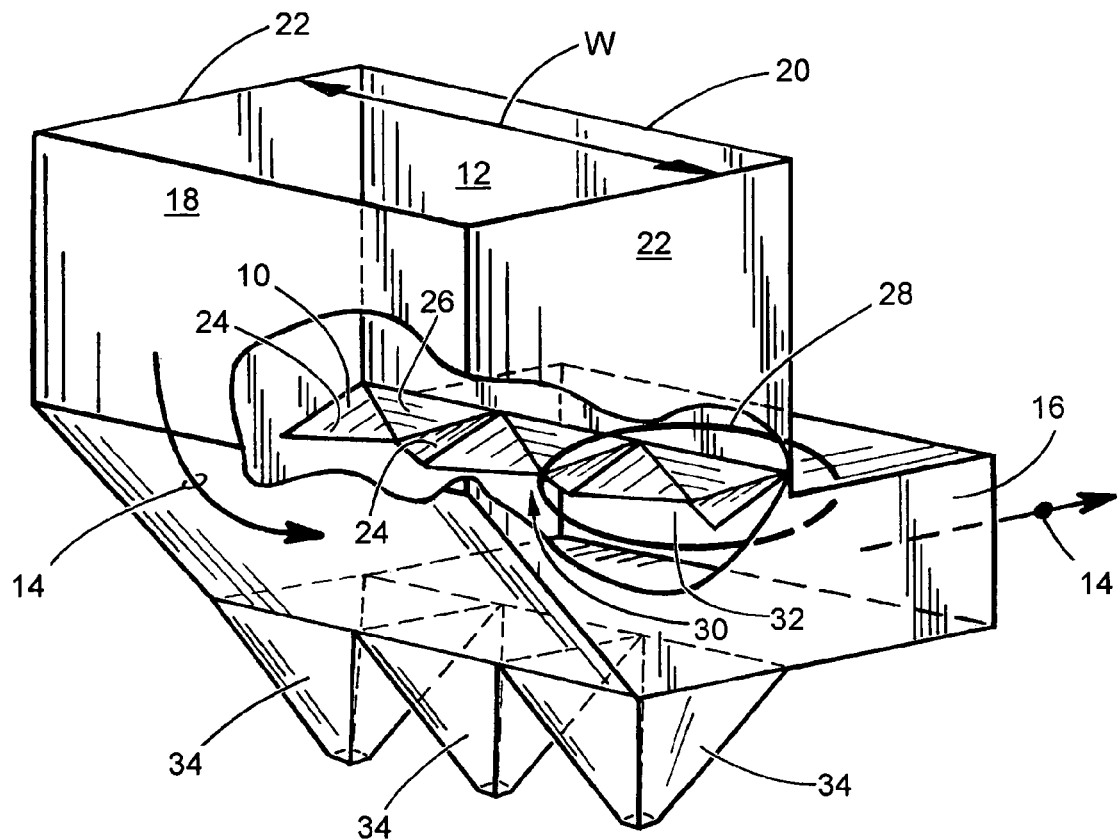
FIG. 1 is a perspective view of the application and placement of the baffle according to the present invention within a lower portion of an economizer gas outlet flue or convection pass enclosure of a steam generator, just upstream (with respect to a flow of flue gases and entrained ash particles flowing therethrough) of an outlet flue attached thereto.

It was determined that the best place to capture the popcorn ash particles before the SCR is the economizer gas outlet. There are a number of attributes of the economizer gas outlet that make it the preferred location for large particle capture, the first being the relatively low flue gas speeds over the hoppers. Once the gas reaches the comparatively small spaces of the flues in the SCR system, its speed increases to the point that separating the ash particles from the gas becomes quite difficult. That the flue gas is traveling down and then turning to the horizontal in the economizer gas outlet is also advantageous since the particles' initial momentum and the force of gravity can act together, and in the same direction, to separate the particles from the gas flow. Lastly, the economizer gas outlet is the logical place to capture the ash particles since the hoppers and ash removal systems are already in existence.

The gas flow patterns in the hopper were studied to determine what could be done to aerodynamically separate out the large ash particles. The aerodynamic solution is often preferred since it normally adds less pressure drop to the system than does another approach involving addition of a screen, and because it is seen to have less maintenance issues than a screen in a high ash environment. However, aerodynamic solutions are not always possible and their capture rate predictions are not as assured as those in the screen solution. The screen approach does not rely as heavily on the accuracy of the measured particle properties or the CFD models and therefore has capture rate predictions for certain particle sizes that are more certain. Also, higher localized gas velocities can normally be found with the aerodynamic solution as can increased potential for fly ash erosion. These issues are much more of a concern with fuels that produce fly ash with highly erosive properties.

Accurately predicting how the popcorn ash behaves within the economizer gas outlet requires detailed knowledge of the aerodynamic properties of the ash particles and sophisticated CFD modeling techniques. The pertinent ash properties include the particle density, drag coefficient, coefficients of restitution, and its coefficient of friction with a steel plate. These were all measured through a series of laboratory experiments and extensive data analysis. The CFD models were then used to solve and map the flue gas flow and popcorn ash particle trajectories using algorithms specifically written for the popcorn ash analysis.

Once representative particle trajectories could be calculated, the ash capturing performance of base designs, different baffle designs, and different economizer hopper designs, was analyzed. Having a measure of the ash capturing ability of a base case provided a benchmark against which modified geometries were compared. Often the capture rate of the popcorn ash particles is quite low in the base case model with the ash particles falling closest to the rear wall being the ones least likely to be captured.

During the course of developing the present invention it was also recognized that there are "good" and "bad" hopper designs which also affect the ability to capture and remove ash from the flue gas flowing through the economizer gas outlet.

Economizer hoppers are typically of a pyramidal design. Hoppers of these shapes will form a valley angle between the two adjacent sloping walls that is shallower than either wall angle. The steepness of this valley angle will influence the flow of solids along the hopper walls and this valley between them. Maintaining the steepest angles practical will facilitate solids withdrawal capability. Hoppers with a vertical wall can have an advantage when orienting vertical wall on the rear or economizer gas outlet side. There, the steep wall at the outlet vestibule can help with the large particle capture dynamics. Vertical walls can also allow an increase in the hopper valley angle along one side, typically though at the expense of additional headroom requirements.

Several aspects of the hopper geometries can cause low capture rates. Some of these include high ridges at the crotches between the hoppers, shallow angles of the hopper walls, and sloping rear walls of the economizer gas outlets. Flat, horizontal surfaces in between the hoppers also tend to decrease ash capture by allowing particles to accumulate and be reentrained in the gas flow. Changing the hopper design and eliminating these detrimental attributes of the geometry often improves the ash capture rate considerably. For additional information on the underlying testing and modeling efforts which led to the development of the present invention, the reader is referred to The Babcock & Wilcox Company technical paper BR-1741 entitled *SCR System Design Considerations for "Popcorn" Ash*, co-authored by Anthony M. Ryan and Bryce St. John, presented to the EPRI-DOE-EPA-AWMA Combined Power Plant Air Pollutant Control Mega Symposium, May 19–22, 2003, Washington, D.C. U.S.A., the text of which is hereby incorporated by reference as though fully set forth herein.

The present invention employs a particular arrangement of baffle plates in a three dimensional configuration to aerodynamically separate the ash particles from the flue gas flow. Referring to the drawings generally, wherein like reference numerals designate the same or functionally similar elements throughout the several drawings, FIG. 1 illustrating the application and placement of the baffle according to the present invention, generally referred to as 10, within a lower portion of an economizer gas outlet flue 12 of a steam generator (not shown), just upstream (with respect to a flow of flue gases and entrained ash particles 14 flowing therethrough) of an outlet flue 16 attached thereto. The economizer gas outlet flue 12 has a front wall 18, a rear wall 20, and side walls 22 interconnecting the front and rear walls 18, 20. The baffle 10 is a three-dimensional baffle for aerodynamically separating the ash particles 14 from the flow of flue gas flowing through the economizer gas outlet flue 12. The baffle 10 is comprised of a plurality of triangular baffle plates 24, 26 arranged in a three dimensional configuration and connected to one another so as to form a plurality of inverted pyramid shapes 28 when the baffle is attached to the rear wall 20 and placed across a width W of the economizer gas outlet flue 12 just below an economizer gas outlet 30. The plurality of triangular baffle plates 24, 26 forming each of the inverted pyramid shapes 28 form three sides of each inverted pyramid shape 28, and each inverted pyramid shape 28 is connected side by side to an adjacent pyramid shape 28 across the width W of the economizer gas outlet flue 12. An open, fourth side 32 of each of the inverted pyramid shapes 28 is located on a side of the baffle 10 closest to the front wall 18 when the baffle 10 is placed within the economizer gas outlet flue 12 just below the economizer gas outlet 30.

Figure 2:
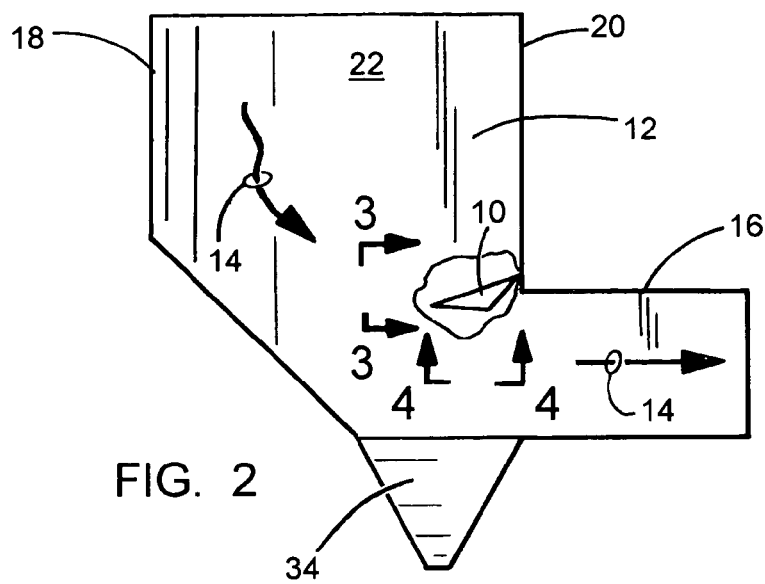
FIG. 2 is a sectional side view of the baffle and economizer gas outlet of FIG. 1.
Figure 3:
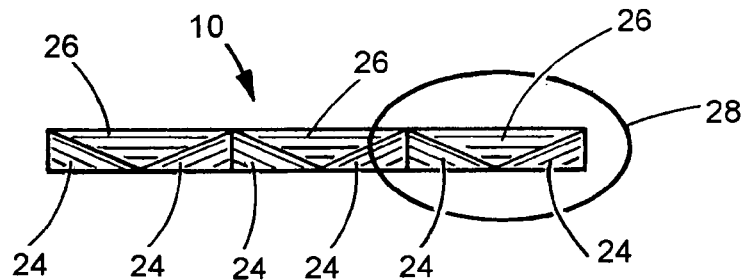
FIG. 3 is a front view of the baffle of FIG. 2, viewed in the direction of arrows 3—3 of FIG. 2.
Figure 4:
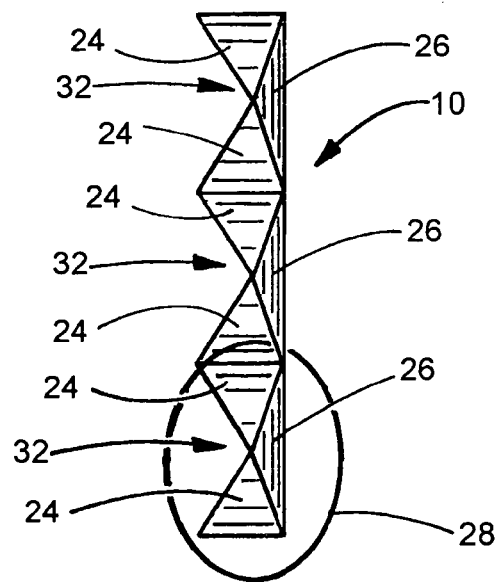
FIG. 4 is a plan view of the baffle of FIG. 2, viewed in the direction of arrows 4—4 of FIG. 2.

FIGS. 2, 3 and 4 illustrate other views of the baffle 10 as applied and located within the economizer gas outlet flue 12. As shown in FIGS. 1–4, a plurality of hoppers 34 are located below the economizer g as outlet flue 12, and the plurality of inverted pyramid shapes 28 are provided in a one-to-one correspondence relationship for each hopper 34. It is also preferred that the center of each inverted pyramid shape 28, the line denoted by the intersection of each of the baffle plates 24, be located substantially over the center of each hopper 34 so as to maximize the directing of the captured ash particles 14 by the baffle 10 into the hoppers 34. If necessary, "half pyramids" may be employed at the side walls 22 of the economizer gas outlet flue 10 in order to preserve this orientation and one-to-one correspondence.

As suggested above, it has also been found that the rate of the aerodynamic capture of popcorn ash particles is dependent upon such things as particle density, particle drag coefficient, and particle size. In general, since variations in these properties from particle to particle have been shown to exist, it is necessary to measure the sensitivity of a design's capture rate to these changes; in some situations there were unacceptably large decreases in capture rate as the density decreased, the drag increased, and the particle size decreased. The ideal geometry has an ash capture rate that is less sensitive to these variations. Occasionally, adjusting the basic geometry is all that has do be done to get an acceptable aerodynamic capture rate. However in most cases the addition of the baffle 10 just below the last bank of economizer (not shown) typically provided in such economizer gas outlet flues 12 on the convection pass rear wall 20 is needed. With this placement, the baffle 10 is properly positioned to redirect the particles 14 that are most likely to escape in the base case more towards the middle of the hoppers 34. By doing the CFD models in three dimensions, the baffle 10's geometry can be refined to funnel the particles 14 directly to the deepest parts of the hoppers 34 where they are least likely to bounce out or be reentrained in the gas flow. The angle between the baffle 10 and the horizontal has to be kept above a certain minimum value to prevent ash from accumulating on top of it. Also, the baffle lengths and angles have to be optimized for the lowest possible pressure drop and to minimize the peak localized gas velocities. In most cases, the addition of the baffle 10 increases the ash capture rate to acceptable levels and makes this rate relatively insensitive to the variation in the ash properties.

Figure 5:
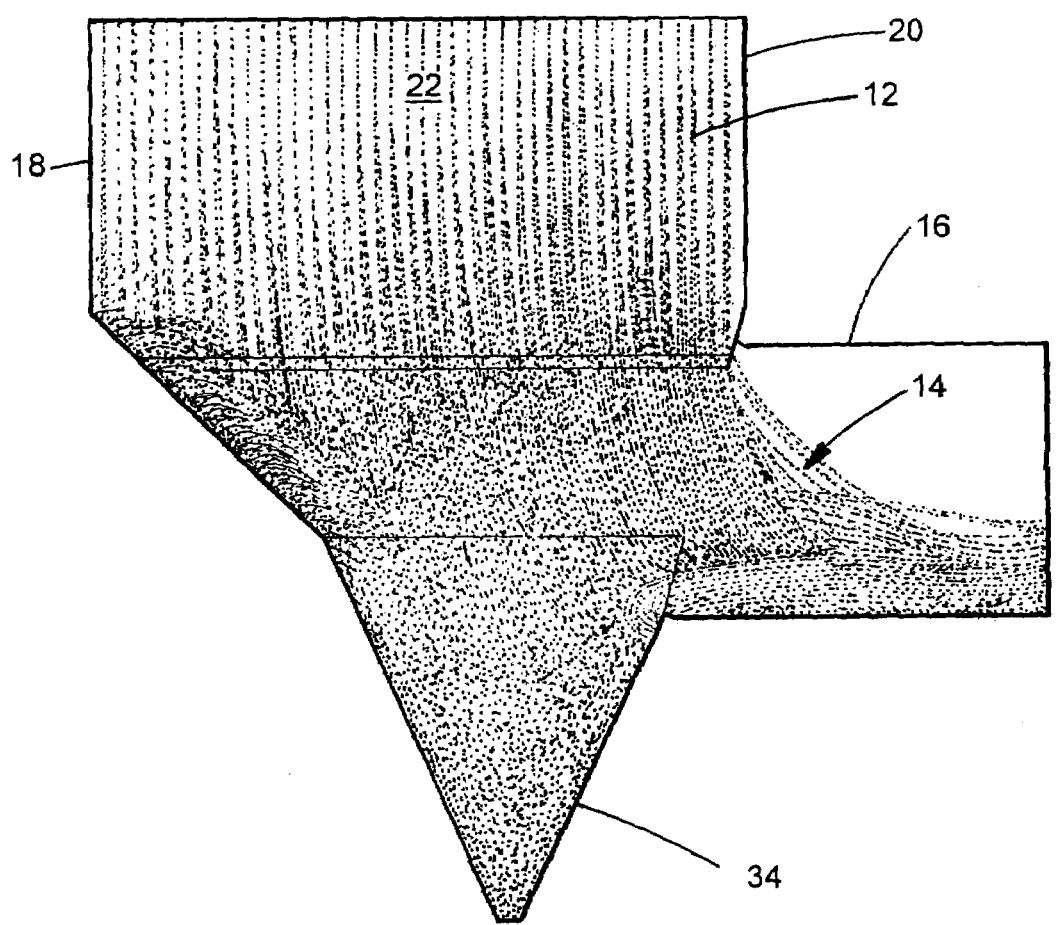
FIG. 5 is an illustration of how flue gas and entrained ash particles typically flows through an economizer gas outlet flue which is not provided with the baffle according to the present invention.
Figure 6:
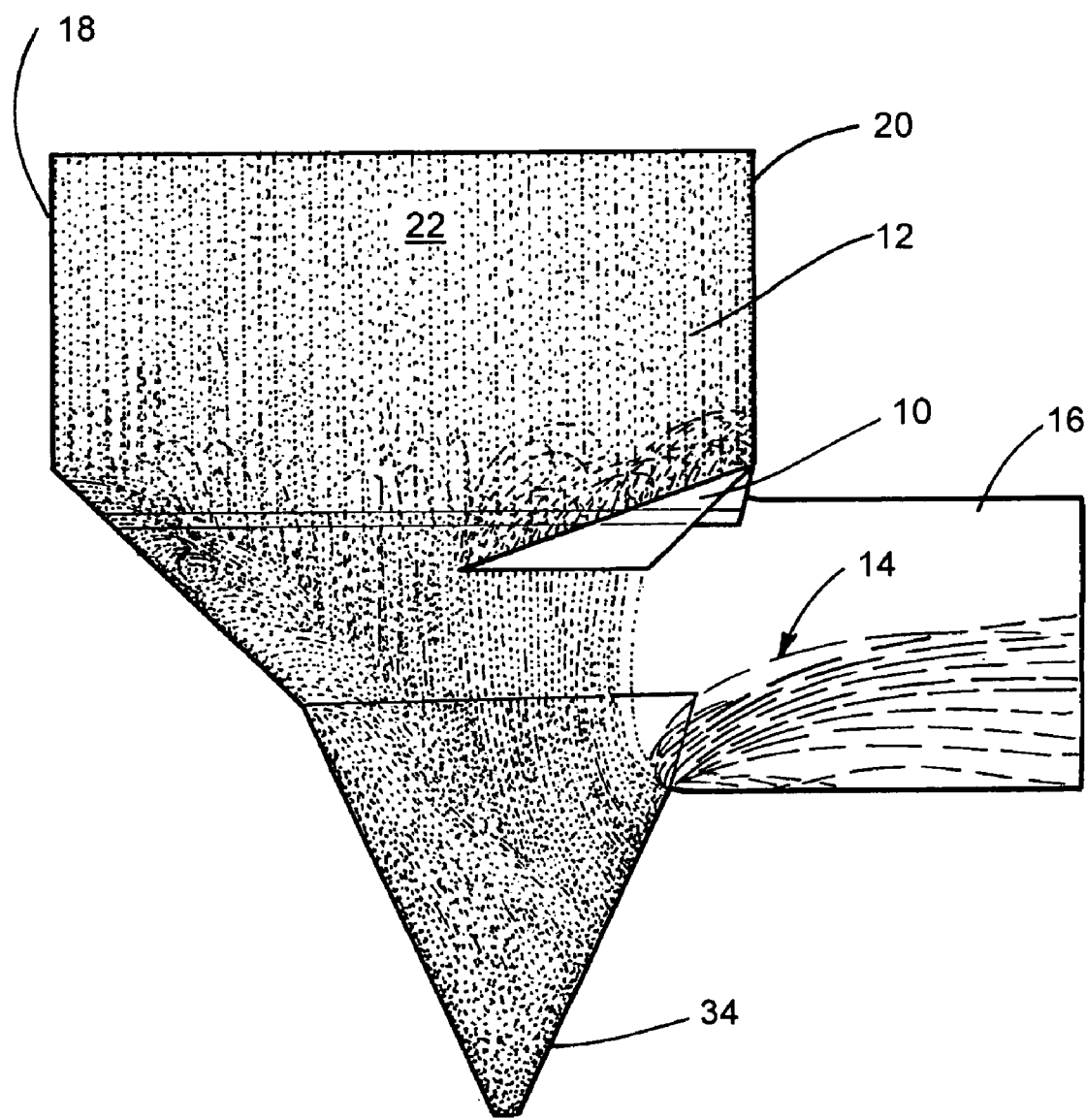
FIG. 6 is an illustration of how flue gas and entrained ash particles typically flows through an economizer gas outlet flue which is provided with the baffle according to the present invention.
Figure 7:
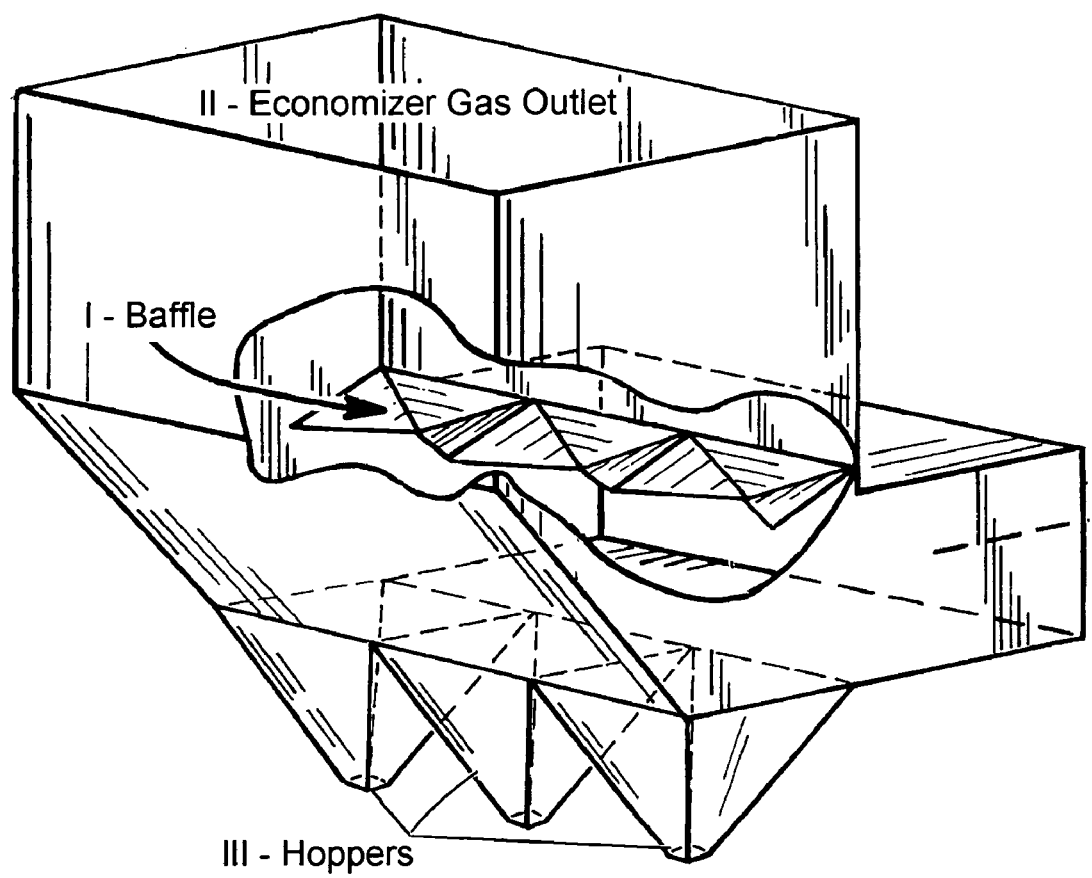
FIG. 7 is another perspective view of the present invention illustrating the three-dimensional shape design of the improved baffle (I) attached to the rear wall of an economizer outlet flue back pass and placed just below the economizer gas outlet (II) to redirect large popcorn ash particles towards the deepest parts of hoppers (III).

FIG. 5 illustrates how flue gas and entrained ash particles typically flows through an economizer gas outlet flue which is not provided with the baffle 10 according to the present invention, while FIG. 6 is an illustration of how flue gas and entrained ash particles typically flows through an economizer gas outlet flue 12 which is provided with the baffle 10 according to the present invention. Note the decreased amount of particles flowing downstream.

The advantages of the invention include an increased capture rate of popcorn ash 14 from 60% to over 98% for some cases. At the site of its first application no plugged catalyst due to popcorn ash 14 has yet been found. The unique three dimensional shape of the newly designed baffle 10 is more efficient than the prior flat baffles as it allows increased particle capture at lower pressure drops. The newly designed baffle 10 also has a lower pressure drop than most wire mesh screen solutions and avoids the plugging and maintenance issues that can be associated with wire screens.

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving steam generators, or to the replacement, repair or modification of existing steam generators, particularly in cases where SCR equipment is being retrofitted to such installations and the prevention of ash carryover into the catalyst modules of such SCRs must be prevented in order for them to function effectively. In some embodiments of the invention, certain features of the invention may sometimes be used to advantage without a corresponding use of the other features. For example, while it was determined that while optimal results may be achieved through proper baffle design in combination with redesigns of existing hopper designs, it will be appreciated that in certain circumstances it may not be practical or possible to redesign the economizer hoppers. This is not a problem in most cases, however, since considerable increases in popcorn ash capture can be achieved by installing the baffle according to the present invention, alone. Accordingly, all such changes and embodiments properly fall within the scope of the following claims.

I claim:

1. A three-dimensional baffle for aerodynamically separating ash particles from a flow of flue gas flowing through an economizer gas outlet flue having a front wall, a rear wall, a width measured between side walls connected to the front and rear walls, and an economizer gas outlet, comprising:

a plurality of triangular baffle plates arranged in a three dimensional configuration and connected to one another so as to form a plurality of inverted pyramid shapes when the baffle is attached to the rear wall and placed across a width of the economizer gas outlet flue just below the economizer gas outlet, the plurality of triangular baffle plates forming each of the inverted pyramids forming three sides of each inverted pyramid, each inverted pyramid shape connected side by side to an adjacent pyramid shape across the width of the economizer gas outlet flue, an open, fourth side of each of the inverted pyramid shapes located on a side of the baffle closest to the front wall when the baffle is placed within the economizer gas outlet flue just below the economizer gas outlet.

* * * * *